Aug. 23, 1938.  G. A. JESSOP  2,127,602
POWER PLANT
Filed July 31, 1937
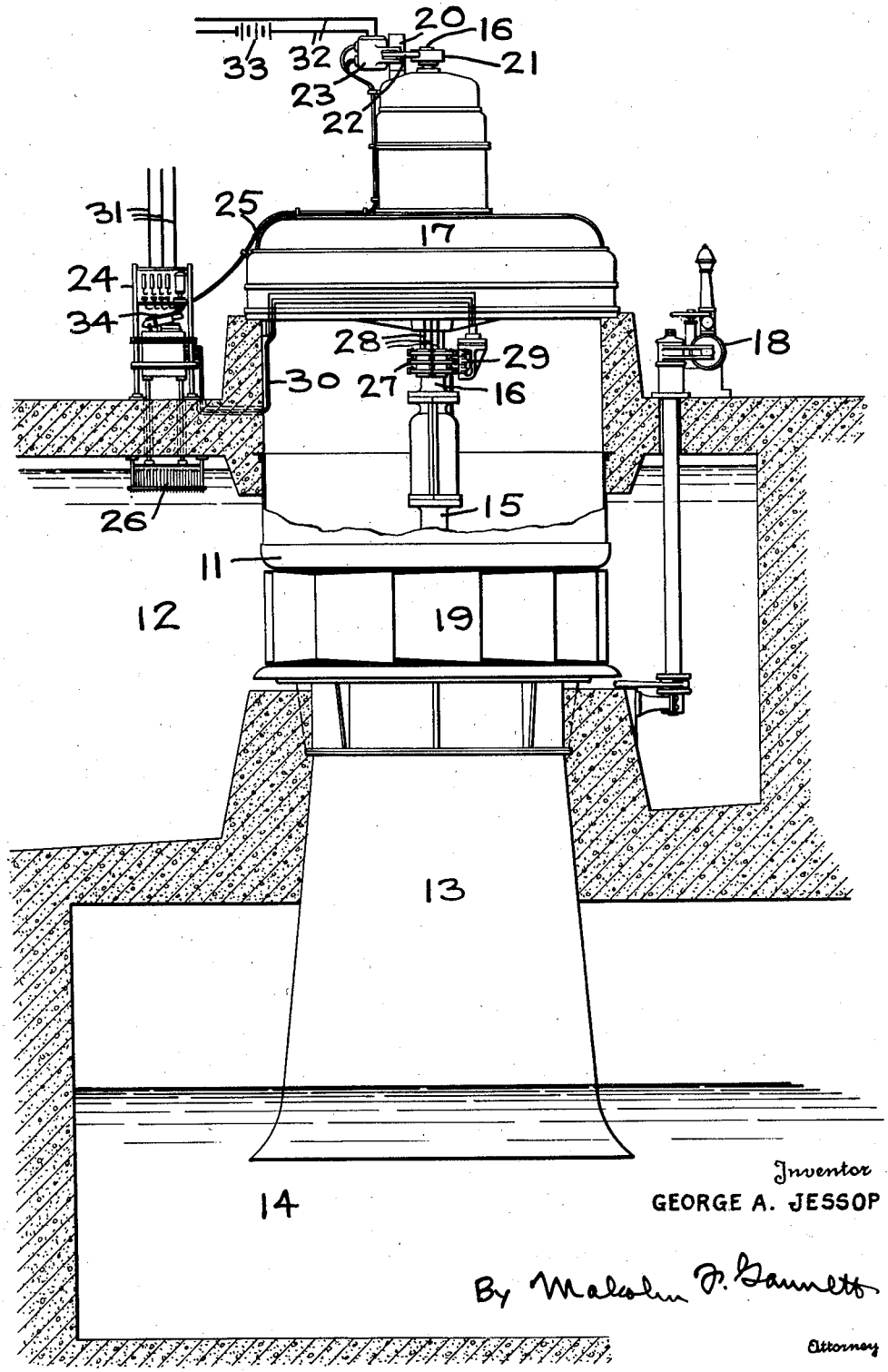
Inventor
GEORGE A. JESSOP
By Malcolm P. Gannett
Attorney Patented Aug. 23, 1938

2,127,602

UNITED STATES PATENT OFFICE 2,127,602

POWER PLANT

George A. Jessop, York, Pa., assignor to S. Morgan Smith Company, York, Pa., a corporation of Pennsylvania Application July 31, 1937, Serial No. 156,619

4 Claims. (Cl. 175—355)

This invention relates to centrifugal machines, and more particularly to means for reducing the runaway speed of centrifugal machines.

An object of the invention is to provide improved means for controlling the operation of centrifugal machines, especially units composed of a prime mover and an electric generator, so as to reduce the overspeed of such units when they lose their commercial power load and their power controlling equipment fails to operate to cut off the energy from the prime mover.

Another object of the invention is to provide improved runaway speed reducing means of the above type, in which the centrifugal machines are controlled by electrically operated control apparatus.

With the foregoing and other objects and advantages in view, the invention consists in the construction and arrangement of the several parts which will be more fully described and claimed.

In the accompanying drawing, the single figure is an elevation partly in vertical section of a well-known type of hydraulic turbine installation, embodying the present invention.

The over-speed or no-load speed of some types of centrifugal machines, such as hydraulic turbines, is sometimes very high. This is particularly true in the case of hydraulic turbines of the type having runners with movable or adjustable blades, and also, although to somewhat less degree, to hydraulic turbines having runners with fixed blades.

The runner of a hydraulic turbine, in general, is of sufficient strength to withstand the natural or full overload. In the case of hydraulic turbines having adjustable blade runners, however, the design of the thrust disk or bearing and the thrust collar to take the centrifugal load of each blade, can be reduced in cost if the runaway speed can be safely limited.

The cost of an electric generator with which a hydraulic turbine is usually connected, can be substantially reduced if the runaway speed is reduced. In the case where hydraulic turbines of the adjustable blade runner type are used to drive electric generators, the cost of the generators, due to the excessively high overspeed, is frequently very much higher than the cost of similar installations using other types of hydraulic turbines.

The invention is also valuable for use with many other types of centrifugal machines, as it provides a reliable, convenient means for reducing the over-speed of such machines.

For instance, the invention can be used in connection with steam turbine units, since such units also have an excessively high runaway speed. In fact, the overspeed of steam turbines is so great that it is necessary to use special shut-down devices, so that when a certain percentage of overspeed is reached, steam is shut off from the unit.

The invention can be used wherever there is a body of quiet water, or where water for cooling is available, or a special tank containing water can be provided.

The invention can also be used with any kind of electrical power absorbing resistance, such as a rheostat.

Prime movers are nearly always supplied with controlling means for shutting off the water, steam or other source of energy. The prime movers are usually so constructed that, if they suddenly lose their load due to electrical disturbances or otherwise, they will automatically shut down. For safety, provision must be made, however, that if the equipment fails to work from accidental or other causes, it will withstand the stresses set up by the abnormally high rotational speed reached. Or sometimes, because of adverse conditions imposed upon the equipment, the controlling apparatus must be shut down very slowly, thus allowing an abnormally high overspeed to be reached when the load is lost suddenly.

Referring to the drawing, the hydraulic turbine indicated at 11, is supplied with water from a flume 12. The water, in passing through the turbine 11, flows through a draft or suction tube 13, and discharges in the usual tailrace 14.

The turbine 11 has a shaft 15 which is connected to the shaft 16 of an electric generator 17, so that the generator is operated by the turbine in well-known manner.

The water passing into the turbine 11, is controlled by means of a governor 18 which is operatively connected to the wicket gates 19 of the turbine in the usual well-known manner.

If the turbine 11 is operating and producing energy in the generator 17 and the load is suddenly lost, and if the governor 18 or the control mechanism fails so that the energy continues to be supplied to the turbine 11, an overspeed will be reached. In the case of an impulse wheel, a Francis or fixed blade propeller turbine, maximum overspeed is obtained with maximum supply of energy, that is at wide open position of the means controlling the supply of water. In the case of the adjustable blade type of turbines, maximum overspeed occurs with the gates in wide open position but with the blades in a partially open position.

According to the present invention, it is proposed to provide means which will automatically throw a substantial load on the generator 17 when a predetermined overspeed is reached.

Operatively connected to the shaft 16 of the generator 17 is a centrifugal switch device 20. The switch device 20 can be directly mounted on the end of shaft 16, or said switch device can be operated by gears or belts or other suitable mechanism from any convenient part of said generator shaft.

The centrifugal switch device 20 comprises a rotating or centrifugal element 21 which is mounted on the generator shaft 16, a finger or plunger 22 which operatively engages the rotating or centrifugal element 21, and an electrical switch or contact 23.

Centrifugal switch devices of this type are well known in the art and can be purchased in the open market from manufacturers of electrical controlling equipment.

When the overspeed of the turbine 11 reaches a certain predetermined number of revolutions for which the switch device 20 is set, the centrifugal element 21 causes the finger or plunger 22 to make a contact or to close the switch 23.

The switch member 23 is electrically connected to a power switch device 24 by means of electric conductors 25, so that when the electric switch 23 operates in the above described manner, the power switch device 24 will be actuated. The power switch device 24 is well-known in the art, and is readily obtainable from manufacturers of electrical controlling apparatus.

Immersed in the water in the flume 12 is a rheostat 26 which is operatively connected with the power switch device 24.

The generator shaft 16 carries collector rings 27 which are connected to the electric generator 17 by conductor 28.

Operatively associated with the collector rings 27 are brushes 29 which are electrically connected to the power switch device 24 by conductors 30.

Leading from power switch device 24 are the power line conductors 31.

Connected to the switch contact member 23 of the centrifugal switch device 20, are conductors 32 for supplying electric current to said switch from a suitable source of electric current supply, such as a storage battery 33.

In operation, when the load goes off, the overspeed of the device becomes very high and consequently the centrifugal switch device 20 is operated by the rapidly rotating generator shaft 16 whereby centrifugal element 21 operatively engages finger or plunger 22 with contact 23. In this way, electric current supplied to the switch device 20 by conductors 32 is carried to the power switch device 24 by conductors 25 and the power switch operated to close its switch element 34. With the element 34 of the power switch 24 thus closed, electric current from the generator 17 will pass from the power switch device downwardly to the rheostat 26 and is carried off into the water in the flume 12.

When normal load conditions return to the turbine and generator, the generator shaft 16 will slow down and when rotating at approximately its predetermined normal revolutions per minute, the centrifugal switch device 20 will open thereby opening the power switch device 24, so that electric current from the generator 17 is again supplied to the main power line conductors 31.

Having thus described my invention, what I claim is:

1. A power plant comprising an electric generator, a hydraulic turbine for operating said generator and having a flume containing operating fluid therefor, a main power line connected to said generator for conducting electric energy produced by the generator, and a rheostat immersed in the operating fluid in the flume of the hydraulic turbine and adapted to be electrically connected with said generator when the operating speed of the generator exceeds a predetermined number of revolutions per minute for dispersing electric energy from said generator into the operating fluid in said flume.

2. A power plant comprising an electric generator, a hydraulic turbine for operating said generator and having a flume containing operating fluid therefor, main power lines connected to said generator for conducting electric energy produced by the generator, a rheostat immersed in the operating fluid of the hydraulic turbine flume and adapted to absorb electric energy, and electric switch means operable by variations in the speed of rotation of said generator and adapted to electrically connect the rheostat with the generator and to disconnect said generator from the main power lines when the speed of rotation of the generator exceeds a predetermined amount.

3. A power plant comprising an electric generator, a hydraulic turbine for operating said generator and having a flume containing operating fluid therefor, a centrifugal switch device operatively connected to the shaft of said generator, said centrifugal switch device being normally open and being adapted to automatically close when the speed of rotation of the generator shaft exceeds a predetermined amount, main power lines for conducting electric energy produced by the generator, a rheostat immersed in the operating fluid of the hydraulic turbine flume and adapted to absorb electric energy, a power switch device operatively connected to said centrifugal switch device and adapted to control the electric current from said generator to said main power lines and to said rheostat, and a source of supply of electric energy connected to said centrifugal switch device and adapted to be supplied to said power switch device for operating the same when said centrifugal switch device is closed.

4. A power plant comprising an electric generator, a hydraulic turbine for operating said generator and having a flume containing operating fluid therefor, a main power line connected to said generator for conducting electric energy produced by the generator, and a rheostat immersed in the operating fluid in the flume of the hydraulic turbine and adapted to be electrically connected with said generator when the operating speed of the generator exceeds a predetermined number of revolutions per minute for absorbing electric energy from said generator.

GEORGE A. JESSOP.